United States Patent
Panesar et al.

(10) Patent No.: US 11,983,087 B2
(45) Date of Patent: May 14, 2024

(54) DETECTING ANOMALOUS LATENT COMMUNICATIONS IN AN INTEGRATED CIRCUIT CHIP

(71) Applicant: Siemens Industry Software Inc., Plano, TX (US)

(72) Inventors: Gajinder Panesar, Cambridge (GB); Marcin Hlond, Cambridge (GB)

(73) Assignee: Siemens Industry Software Inc., Plano, TX (US)

( * ) Notice: Subject to any disclaimer, the term of this patent is extended or adjusted under 35 U.S.C. 154(b) by 60 days.

(21) Appl. No.: 17/780,339

(22) PCT Filed: Nov. 26, 2020

(86) PCT No.: PCT/EP2020/083478
§ 371 (c)(1),
(2) Date: May 26, 2022

(87) PCT Pub. No.: WO2021/110529
PCT Pub. Date: Jun. 10, 2021

(65) Prior Publication Data
US 2023/0004473 A1    Jan. 5, 2023

(30) Foreign Application Priority Data
Dec. 3, 2019  (GB) .................................... 1917654

(51) Int. Cl.
| G06F 11/00 | (2006.01) |
| G06F 11/07 | (2006.01) |
| G06F 11/34 | (2006.01) |

(52) U.S. Cl.
CPC ...... *G06F 11/3419* (2013.01); *G06F 11/0754* (2013.01); *G06F 11/0757* (2013.01)

(58) Field of Classification Search
CPC ............. G06F 11/0754; G06F 11/0757; G06F 11/3419
See application file for complete search history.

(56) References Cited

U.S. PATENT DOCUMENTS

| 7,802,039 B2 | 9/2010 | Morita |
| 8,401,821 B1 | 3/2013 | Sertamo |
(Continued)

FOREIGN PATENT DOCUMENTS

| JP | 2000295312 A | 10/2000 |
| JP | 2008152665 A | 7/2008 |
(Continued)

OTHER PUBLICATIONS

International Search Report and Written Opinion cited in corresponding international application No. PCT/EP2020/083478; dated Mar. 17, 2021; 15pp.

(Continued)

*Primary Examiner* — Joshua P Lottich
(74) *Attorney, Agent, or Firm* — Lempia Summerfield Katz LLC

(57) ABSTRACT

A method of detecting anomalous latencies in communications between components on an integrated circuit (IC) chip. The method includes: (i) monitoring communications between a first component of the IC chip and other components of the IC chip, each communication comprising a command sent from the first component to another component, and a response received by the first component from that other component, the monitoring comprising: measuring the number of communications in each of a series of monitored time windows, and measuring the latency of each communication in the series of monitored time windows; (ii) calculating a maximum tolerable latency for each operational time window of the first component from the number of communications in that operational time window, an (Continued)

available stall time of the first component in that operational time window, and a latency penalty factor for that operational time window; and (iii) determining a measured latency to be anomalous if the measured latency is greater than the maximum tolerable latency.

20 Claims, 5 Drawing Sheets

(56) References Cited

U.S. PATENT DOCUMENTS

| | | | |
|---|---|---|---|
| 8,417,812 | B1 | 4/2013 | Gulati et al. |
| 8,832,330 | B1* | 9/2014 | Lancaster ............ G06F 11/3452 710/18 |
| 9,152,519 | B2 | 10/2015 | Ando et al. |
| 9,160,640 | B1 | 10/2015 | Carlson et al. |
| 10,114,582 | B1* | 10/2018 | Rao ....................... G06F 3/0683 |
| 11,394,628 | B1* | 7/2022 | Chakkassery Vidyadharan .......... G06F 11/3006 |
| 2008/0155358 | A1 | 6/2008 | Arataki et al. |
| 2012/0198266 | A1 | 8/2012 | Hofmann et al. |
| 2012/0238284 | A1* | 9/2012 | Dyck ................... H04W 72/543 455/452.2 |
| 2014/0365809 | A1 | 12/2014 | Higeta et al. |
| 2015/0260787 | A1 | 9/2015 | Chang |
| 2016/0003910 | A1 | 1/2016 | Ishimi |
| 2016/0196231 | A1 | 7/2016 | Quach et al. |
| 2017/0142033 | A1* | 5/2017 | Teter .................... H04L 43/0805 |
| 2019/0208467 | A1* | 7/2019 | Lu ........................ H04L 67/1025 |
| 2019/0245766 | A1* | 8/2019 | Onoue ................. H04L 41/0659 |
| 2020/0295986 | A1* | 9/2020 | Rathinasabapathy ..... G06F 8/65 |
| 2020/0409779 | A1* | 12/2020 | Lester ................. G06F 11/2053 |

FOREIGN PATENT DOCUMENTS

| | | |
|---|---|---|
| JP | 2009025866 A | 2/2009 |
| JP | 2014238670 A | 12/2014 |
| WO | 2012049760 A1 | 4/2012 |

OTHER PUBLICATIONS

Search Report cited in corresponding patent application No. GB1917654.4; dated Apr. 22, 2020; 3 pp.

* cited by examiner

DETECTING ANOMALOUS LATENT COMMUNICATIONS IN AN INTEGRATED CIRCUIT CHIP

RELATED CASE

The present patent document is a § 371 nationalization of PCT Application Serial Number PCT/EP2020/083478, filed Nov. 26, 2020, which claims priority to GB 1917654.4, filed Dec. 3, 2019, which are hereby incorporated by reference.

FIELD

The present embodiments relate to analysing communications between components within a System-on-Chip (SoC) or multi-chip module (MCM).

BACKGROUND

In the past, an embedded system which had multiple core devices (processors, memories etc.) would have been incorporated onto a Printed Circuit Board (PCB) and connected on the PCB via buses. Traffic in the embedded system was conveyed over these buses. This arrangement was convenient for monitoring the core devices, because monitoring tools such as oscilloscopes and logic analysers could be attached to the PCB's buses allowing direct access to the core devices.

Market demand for smaller products coupled with advances in semiconductor technology has led to the development of System-on-Chip (SoC) devices. In a SoC, the multiple core devices of an embedded system are integrated onto a single chip. In a SoC, the traffic in the embedded system is conveyed over internal buses, thus connection of monitoring tools directly to the system bus is no longer possible. The resulting reduced access coupled with an increasing quantity of data being transported around the chip (due to developments of SoC technology leading to integration of multiple processing cores and higher internal clocking frequencies), has reduced the ability of external monitoring tools to monitor the system for security breaches, bugs, and safety concerns within the timescales demanded by the industry. Additionally, when multiple core devices are embedded onto the same single chip, the behaviour of each individual core device differs from its behaviour in isolation due to its interaction with the other core devices as well as real time events such as triggers and alerts.

Thus, the development of SoC devices required associated development in monitoring technology, which lead to the integration of some monitoring functionality onto the SoC. It is now known for monitoring circuitry within the SoC to trace the output of processors executing programs on core devices (such as CPUs). The trace data is generally output for analysis off-chip.

SUMMARY

It would be desirable to generate more detailed analysis of the impact on the core devices of competition for shared resources, such as shared use of the communication circuitry for communicating between the core devices.

According to a first aspect, there is provided a method of detecting anomalous latencies in communications between components on an integrated circuit (IC) chip, the method comprising: (i) monitoring communications between a first component of the IC chip and other components of the IC chip, each communication including a command sent from the first component to another component, and a response received by the first component from that other component, the monitoring including: measuring the number of communications in each of a series of monitored time windows, and measuring the latency of each communication in the series of monitored time windows; (ii) calculating a maximum tolerable latency for each operational time window of the first component from the number of communications in that operational time window, an available stall time of the first component in that operational time window, and a latency penalty factor for that operational time window; and (iii) determining a measured latency to be anomalous if the measured latency is greater than the maximum tolerable latency.

The latency penalty factor for an operational time window may be the average minimum number of bytes that the first component can tolerate between latent responses in that operational time window.

The maximum tolerable latency of an operational time window may be calculated according to: $MTL_i = TS_i * BP_i / B_i$, where $MTL_i$ is the maximum tolerable latency of operational time window i, $TS_i$ is the available stall time of the first component in operational time window i, $BP_i$ is the latency penalty factor in operational time window i, and $B_i$ is the number of bytes in the operational time window i.

Act (iii) may include: determining the maximum latency of the measured latencies in each of the series of monitored time windows; comparing the maximum latency to the maximum tolerable latency; and determining that maximum latency to be anomalous if the maximum latency is greater than the maximum tolerable latency.

The method may further include calculating the available stall time of the first component in each operational time window from the operational time window length and a reserved processing time, the reserved processing time being that used by the first component to perform computations.

The available stall time of the first component in each operational time window may be calculated according to: $TS_i = WL_i * (1 - RS_i)$, where $TS_i$ is the available stall time of the first component in an operational time window i, $WL_i$ is the length of the operational time window i, and $RS_i$ is the proportion of time reserved for the first component to perform computations.

The method may further include determining the bandwidth of each of the series of monitored time windows from the measured number of communications in that monitored time window.

The method may further include determining a set of bandwidths and latencies for each of a series of operational time windows of the first component from the bandwidths and the measured latencies of the series of monitored time windows of act (i).

Each operational time window may be greater than each monitored time window.

The method may include aggregating the bandwidths and measured latencies of the series of monitored time windows of act (i) to form the set of bandwidths and latencies for each of the series of operational time windows of the first component.

The latencies of each of the series of operational time windows of the first component may be maximum latencies of the series of monitored time windows.

The method may further include correlating the bandwidth and measured latency for each of the series of operational time windows.

The correlation may include correlating the bandwidth and maximum latency for each of the series of operational time windows.

The method may further include monitoring communications between each component of a set of components on the IC chip and other components of the IC chip, the monitoring of each component of the set being according to act (i).

The method may further include, for each component of the set, determining the bandwidth of each of the series of monitored time windows from the measured number of communications in that monitored time window.

The method may further include, for each component of the set of components, correlating the bandwidth and measured latency for each of the series of operational time windows.

The correlation may include correlating the bandwidth and maximum latency for each of the series of operational time windows.

The correlation may include correlating the bandwidth and maximum latency of operational time windows which are shifted in time with respect to each other.

The method may further include comparing the correlations of different components of the set of components.

According to a second aspect, there is provided an integrated circuit (IC) chip including: system circuitry including components; monitoring circuitry configured to monitor communications between the components of the system circuitry, each communication including a command sent from a first component to another component, and a response received from the other component by the first component, the monitoring circuitry including: a counter configured to measure the number of communications in each of a series of monitored time windows; a latency timer configured to measure the time taken between a command being sent from the first component to another component, and a response being received by the first component; and a processor configured to: calculate a maximum tolerable latency for each operational time window of the first component from the number of communications in that operational time window, an available stall time of the first component in that operational time window, and a latency penalty factor for that operational time window; and determine a measured latency to be anomalous if the measured latency is greater than the maximum tolerable latency.

BRIEF DESCRIPTION OF THE FIGURES

The present invention will now be described by way of example with reference to the accompanying drawings. In the drawings.

DETAILED DESCRIPTION

The following disclosure describes a monitoring architecture suitable for implementation on an integrated circuit chip. The integrated circuit chip may be a SoC or a multi-chip module (MCM).

Figure 1:
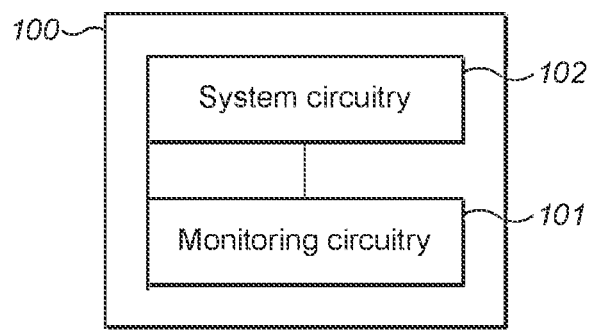
FIG. 1 is a schematic drawing of an exemplary integrated circuit chip device.
Figure 2:
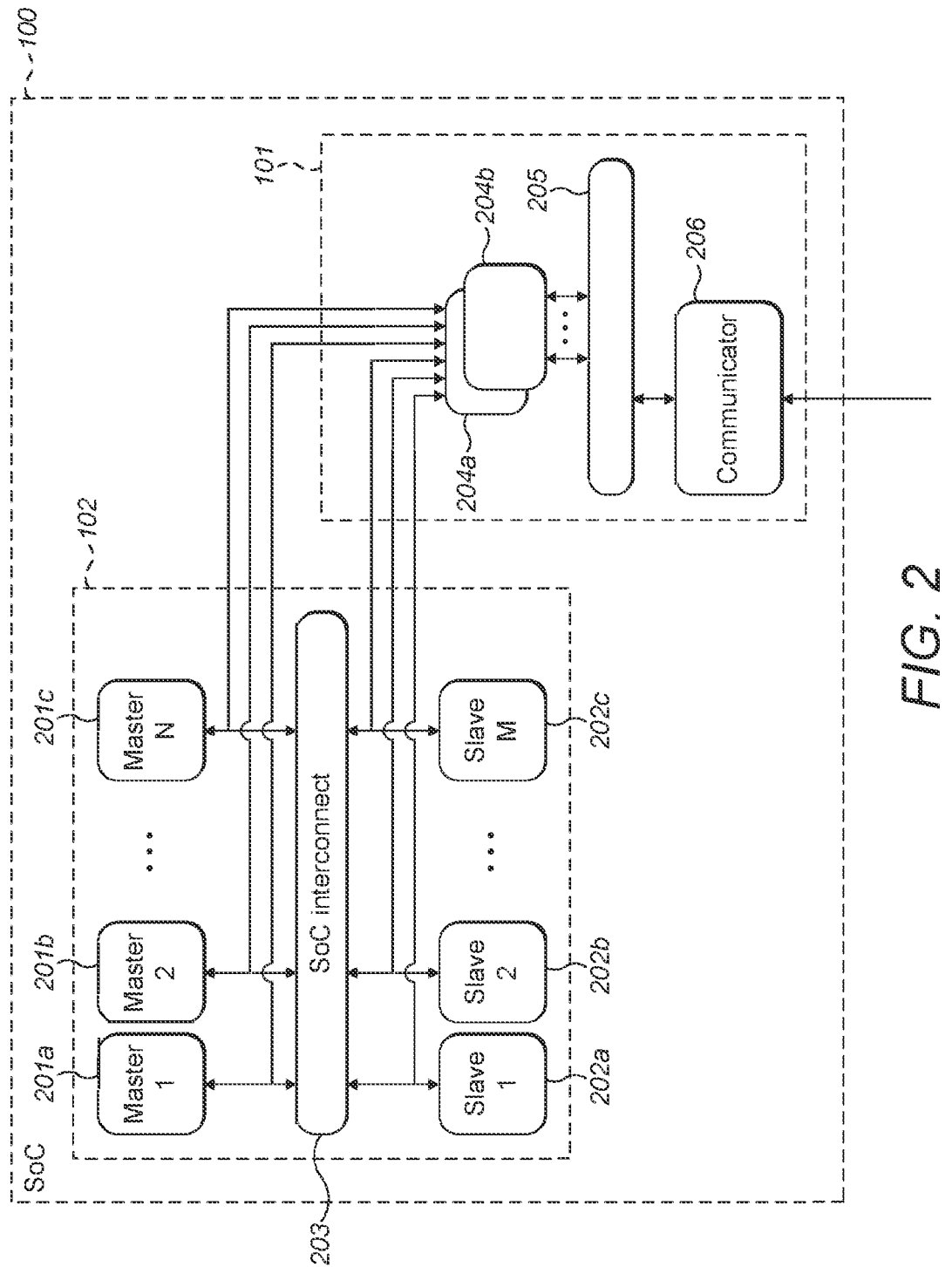
FIG. 2 is a schematic drawing of an exemplary monitoring network and system circuitry on an integrated circuit chip device.
Figure 3:
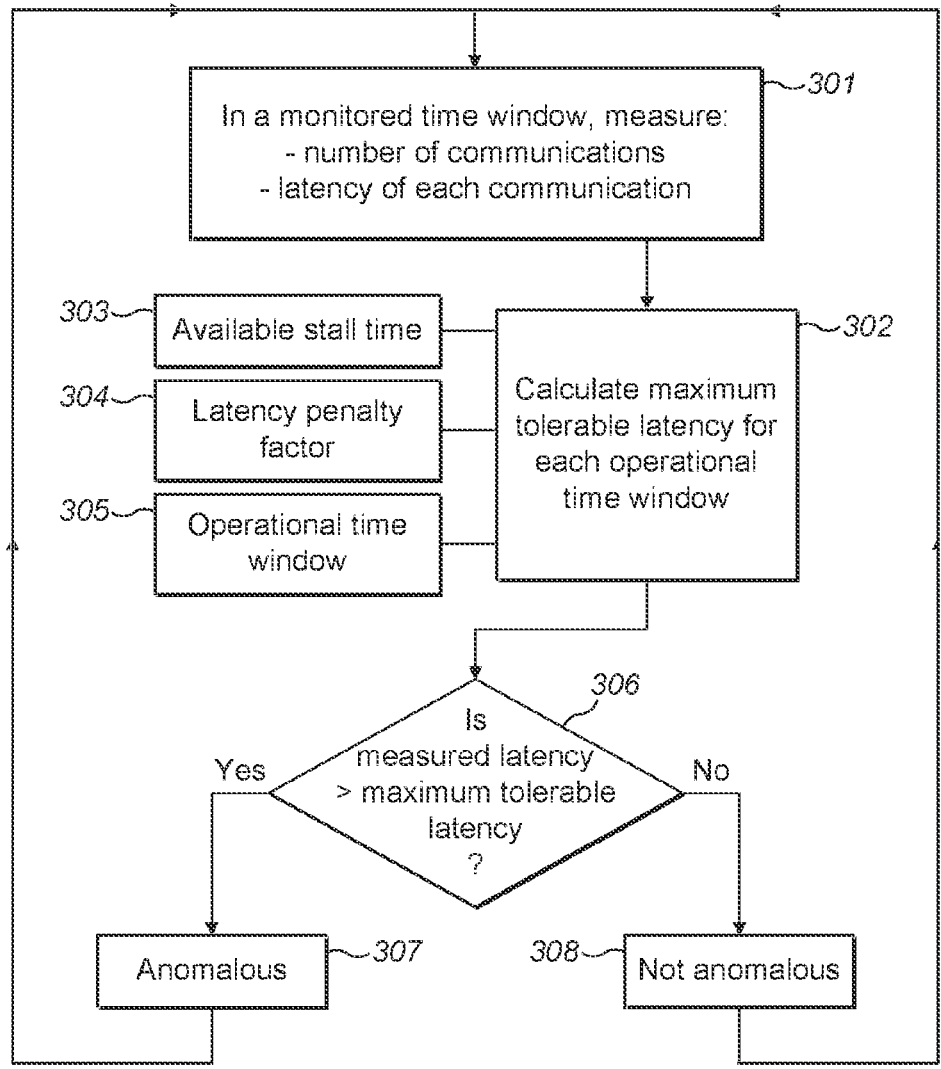
FIG. 3 is a flowchart of a method of detecting anomalous latencies in communications between components of a SoC according to one embodiment.
Figure 5:
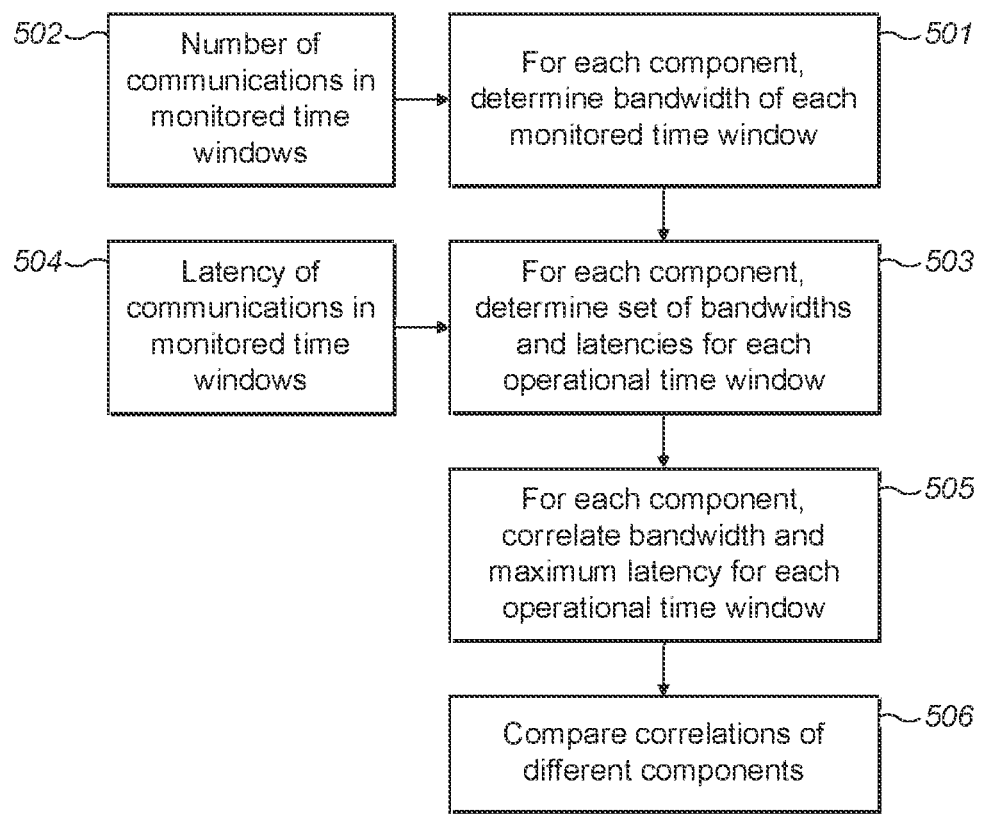
FIG. 5 is a flowchart of a method of correlating bandwidth and latency for components of the SoC according to one embodiment.

FIGS. 1 and 2 are schematic diagrams of exemplary system architectures, and components within the system architectures. These figures present the structures in terms of functional blocks. Some functional blocks for carrying out functions well known in the art have in places been omitted from these figures. FIGS. 3 and 5 are flowcharts illustrating methods of analysing statistical data measured by the monitoring circuitry. Each flowchart depicts an order in which the method of that flowchart can be performed. However, the flowcharts are not intended to restrict the described methods to being implemented in the orders depicted. The acts of the methods may be carried out in alternative orders to those depicted in the flowcharts.

FIG. 1 illustrates the general structure of an exemplary monitoring network for a SoC 100. Monitoring circuitry 101 is arranged to monitor system circuitry 102. For example, for the purposes of detecting improper operation of the core devices relating to safety or security concerns.

FIG. 2 illustrates exemplary system circuitry including core devices 201, 202 connected via a SoC interconnect 203. Core devices 201a, 201b, 201c are master devices. Core devices 202a, 202b, 202c are slave devices. Any number of core devices can be suitably integrated into the system circuitry, as indicated by the numbering of the master and slave devices as 1, 2, . . . N on FIG. 2. The SoC interconnect 203 forms a communication backbone for the SoC, through which the master and slave devices communicate with each other. These communications are bi-directional.

Master devices are those which initiate traffic, such as read/write requests in a network. Examples of master devices are processors such as a DSP (digital signal processor), video processor, applications processor, CPU (central processor unit), and GPU (graphics processor unit). Any programmable processor may be a master device. Other examples of master devices are those with DMA (direct memory access) capability, such as conventional DMAs for moving data from one location to another, autonomous coprocessors with DMA capability (such as an encryption engine), and peripherals with DMA capability (such as an Ethernet controller).

Slave devices are those which respond to the commands of the master devices. Examples of slave devices are on-chip memories, memory controllers for off-chip memories (such as DRAM), and peripheral units.

The topology of the SoC interconnect 203 is SoC dependent. For example, it may include any one or combination of the following types of network to transport communications around the system circuitry: a bus network, a ring network, a tree network, or a mesh network.

The monitoring circuitry 101 includes monitoring units 204a, 204b connected to a communicator 206 via a monitoring interconnect 205.

Any number of monitoring units can be suitably integrated into the monitoring circuitry. Each monitoring unit is connected to a communication link between a master device and a slave device. This connection may be between a master device and the SoC interconnect, for example at the interface between the master device and the SoC interconnect. The connection may be between the SoC interconnect and a slave device, for example at the interface between the slave device and the SoC interconnect. Each monitoring unit may be connected to a single communication link. Alternatively, one or more monitoring units of the monitoring circuitry 101 may be connected to a plurality of communication links. The monitoring units 204 monitor the operation of the core devices by monitoring the communications on the monitored communication links. Optionally, the monitoring units may also be able to manipulate the operation of the core devices that they are monitoring.

The communicator 206 may be an interface for communicating with entities off-chip. For example, monitoring circuitry 101 may communicate with an off-chip analyser via communicator 206. Communicator 206 may additionally or alternatively be configured to communicate with other entities on-chip. For example, monitoring circuitry 101 may communicate with an on-chip analyser via communicator 206. Although FIG. 2 illustrates one communicator 206, any number of communicators can be integrated onto the SoC. The communicators implemented are chosen in dependence on the type of connections that are to be made. Exemplary communicators include: JTAG, parallel trace input/output, and Aurora based high-speed serial interface; and reuse of system interfaces such as USB, Ethernet, RS232, PCIe and CAN.

The topology of the monitoring interconnect 205 may include any one or combination of the following types of network to transport communications around the monitoring circuitry: a bus network, a ring network, a tree network, or a mesh network. The communication links between the monitoring units 204 and the communicator 206 are bi-directional.

The bandwidth demands of the SoC interconnect 203 by a master device 201 and the latency expectations of responses provided to its commands by the SoC interconnect 203 vary from master device to master device. For example, the bandwidth generated from memory access by a CPU may not be high, however low latency on the read data provided in response to the CPU's requests is generally required. This is especially the case in response to cache miss accesses. Conversely, high bandwidth may be generated from DMA memory accesses, however higher latency on the read data provided in response may be tolerated.

In a complex SoC, there can be hundreds or thousands of master devices and slave devices. Each master device has its own traffic profile. As a result, each master device has its own bandwidth expectations, which may be different globally as opposed to per data flow. Each master device also has its own expectations as to how much latency it will tolerate, which may be different globally as opposed to per data flow. Both the bandwidth and latency expectations of a master device may vary depending on the workload that the SoC has to support.

The SoC interconnect 203 is a finite resource. Data flows originating from different master devices compete for interconnect resources, such as internal buffers. This results in complex interdependencies between traffic generated by different master devices. The greater the number of active master devices on the SoC, the greater the complexity of the interdependencies.

Each master device communicates with a slave device as follows with respect to a read request: the master device issues a read request which the slave device receives, and in response the slave device issues a read result which the master device receives. The time taken between the request being issued by the master device and the response being received by the master device is the latency of the communication. Similarly, each master device communicates with a slave device as follows with respect to a write request: the master device issues a write request which the slave device receives, the slave device consumes the data (for example, by writing the data to memory), and the slave device issues a write response which the master device receives. The time taken between the write request being issued by the master device and the response being received by the master device is the latency of the write communication.

The master device may be arranged such that the read results are not required by it immediately after the read request is issued. For example, the master device may be arranged to execute other instructions which are not dependent on the data in the read response in between issuing the read request and requiring the read response for an operation. Thus, a degree of latency of each communication can be tolerated by the master device. This is because that latency is effectively hidden to the master device behind other activity which does not rely on the read response of that communication. However, if the latency is long enough, then the master device will reach a point in its instruction execution where it cannot progress until it has received the read response. At this point, the master device has to wait for the read result before performing any further actions. For example, a CPU is unable to progress an instruction stream execution without receiving a read result when the next instruction to execute needs the data in that read result as an input. As another example, a CPU pipeline is unable to continue instruction execution when it is waiting for an instruction fetch. As another example, a DMA engine performing a copy is unable to continue operation without receiving a read result because it needs the data in that read result before the next write can be performed. The waiting time between the master not being able to progress any further operations and receiving the read result so that it can progress further operations is known as stall time.

Ideally, a master device does not have to wait for read results at all: they are always available when needed. In other words, the stall time is zero. This can be achieved by the communications having a latency between a minimum latency value (determined by the maximum speed of the communication with the slave device and the minimum time taken by the slave device to produce the read result) and a maximum no-stall latency of the master device.

However, as the latencies of the communications increase, some will be above the maximum no-stall latency. At this point, the master device will start to experience stall time. As the latencies increase, the stall time increases. The amount of stall time that the master device can tolerate depends on the task that it is performing, how fast it can perform that task, and the processing deadlines that it needs to honour. The tolerable stall time of the master device varies depending on its workload. As its workload increases, its ability to tolerate stall time decreases.

As described above, the monitoring units 204 of FIG. 2 monitor the communications between the master 201 and slave 202 devices. The monitoring units may gather statistics from the communications that they monitor. The statistics gathered and the time window over which this is done is configurable. For example, each monitoring unit 204 may receive a configuration command(s) from an on-chip or off-chip analyser commanding the monitoring unit to monitor specific communication parameters. The analyser may also specify the time window over which the parameters are to be monitored. The analyser may also specify when the collected data is to be reported to the analyser. Typically, the analyser requires the collected data to be reported periodically.

Thus, a monitoring unit 204 may be configured to monitor the communications of its connected component (be that a master device 201 or a slave device 202) over a series of monitored time windows. The length of each monitored time window may be specified by the analyser as described above. The monitored time windows may be non-overlapping. For example, the monitored time windows may be contiguous. Alternatively, the monitored time windows may be overlapping. The monitoring unit 204 may measure the number of communications in each monitored time window. For example, if the monitoring unit is monitoring a master device, it may measure the number of command requests sent by the master device and the number of responses received by the master device. If on the other hand, the monitoring unit is monitoring a slave device, it may measure the number of command requests sent to the slave device, and the number of responses sent by the slave device. The monitoring unit 204 may measure the latency of each communication in the monitored time window.

The bandwidth in a monitored time window may be derived from the number of communications in the monitored time window, and the length of the monitored time window. The maximum latency in the monitored time window is the highest latency of the measured latencies. The bandwidth and maximum latency of each monitored time window may be determined by the monitoring unit. The monitoring unit may then report the following to the analyser: (i) the bandwidth of the monitored time window, (ii) the maximum latency in the monitored time window, optionally (iii) the number of communications in the monitored time window, and optionally (iv) the measured latencies in the monitored time window. Alternatively, the bandwidth and/or maximum latency of each monitored time window may be determined by the analyser. If both the bandwidth and maximum latency are determined by the analyser, then the monitoring unit may report the following to the analyser: (i) the number of communications in the monitored time window, and (ii) the measured latencies in the monitored time window. If the bandwidth is determined by the analyser, and the maximum latency is determined by the monitoring unit, then the monitoring unit may report the following to the analyser: (i) the number of communications in the monitored time window, (ii) the maximum latency in the monitored time window, and optionally (iii) the measured latencies in the monitored time window.

The measured data over a series of monitored time windows can then be used in combination with other parameters of the component being monitored in further statistical analysis. In the methods described below with reference to FIGS. 3 to 5, two parameters of each component are used.

The first parameter is the operational time window of the component. Each component has a natural operational time window length. For example, for a CPU which performs periodic activity with limited time available for each iteration, the operational time window of that component would be the time of each iteration of the periodic activity. As another example, for a component which is required to communicate according to serial network slots, the operational time window of that component would be defined by the length of those network time slots. The operational time window length of a component is likely to be different to the monitored time window length(s) used by the monitoring unit(s) which is monitoring that component. Typically, the operational time window of the component is longer than the monitored time window. For example, the length of an operational time window may be between 10 ms and 100 ms. Whereas, the length of a monitored time window may be between 0.5 μs and 10 μs. The methods described below analyse data over a series of operational time windows of a component.

The second parameter is the latency penalty factor for an operational time window of the component. The latency penalty factor is the average minimum number of bytes that the component can tolerate between latent responses in the operational time window. Latent responses are those which cause the component to stall (in at least the operation which is dependent on the content of the latent response). The latency penalty factor depends on the workload of the component and on the concurrency available to the component. If the component is able to concurrently process several instructions then, subject to its overall workload, it may have more capacity to tolerate latency in its communications.

These two parameters of the component are predetermined. For example, they may be known from knowledge of the system architecture. For example, a CPU may be known to perform periodic operations with a known period. The parameters may be determined empirically from observing the behaviour of the component. The parameters may be determined by a process of repetitive sweeping, in which several parameter values are tested, and the analysis of known latency anomalies assessed for each of the tested parameter values. The parameter values which result in the latency anomalies being best detected are then selected for use.

A method will now be described for detecting anomalous latencies in communications between components on an integrated circuit chip, such as the one shown in FIG. 2. Latencies are identified as anomalous if they are longer than a maximum tolerable latency for that operational time window of the component. The maximum tolerable latency is different to the maximum no-stall latency described above. The maximum no-stall latency is the length of latency in a communication which the component can endure without its operation being interrupted at all. In other words, the maximum no-stall latency is the maximum latency that the component can be exposed to whilst having no stall time. On the other hand, the maximum tolerable latency is the length of latency the component can endure in an operational time window whilst still getting all of its required tasks done in the required time. Thus, the maximum tolerable latency allows for some stall time of the component, as long as this stall time can be accommodated whilst also completing the operations required of the component in the operational time window.

The method for detecting anomalous latencies in communications of a component on a SoC will now be described with reference to FIG. 3. In an exemplary implementation, the component is a master device 201 which communicates with slave devices 202 of the SoC by sending commands to those components, and receiving a response for each command that it sends. At act 301, a monitoring unit 204 monitors the communications of the component by measuring (i) the number of communications in each of a series of monitored time windows, and (ii) the latency of each communication in the series of monitored time windows. For example, the monitoring unit 204 may include a counter configured to increment each time a new communication is detected. The monitoring unit 204 may include a latency timer configured to measure the time between a command being sent from the component and a response to that command being received by the component.

The method then proceeds to act 302. At act 302, a processor calculates a maximum tolerable latency for each operational time window of the component. To do this, the processor determines the number of communications in the operational time window from the number of communications measured in the series of monitored time windows at act 301. For example, the processor may retrieve the operational time window length, determine the number of monitored time windows which fit into an operational time window. The processor then determines which set of monitored time windows maps onto each operational time window. The processor sums up the number of communications in that set of monitored time windows to yield the number of communications in the operational time window.

The processor uses as inputs to the calculation of act 302: the number of communications in the series of monitored time windows obtained at act 301, the available stall time of the component in the operational time window, and the latency penalty factor for that operational time window. The maximum tolerable latency for an operational time window of a component may be determined by:

$$MTL_i=TS_i*BP_i/B_i \qquad \text{(equation 1)}$$

where $MTL_i$ is the maximum tolerable latency of operational time window i, $TS_i$ is the available stall time of the component in operational time window i, $BP_i$ is the latency penalty factor in operational time window i, and $B_i$ is the number of bytes in the operational time window i.

The number of latency penalty events which can be tolerated by the component in an operational time window is given by:

$$PEi=B_i/BP_i \qquad \text{(equation 2)}$$

Thus, in other words, the maximum tolerable latency of an operational time window i can be expressed as:

$$MTL_i=TS_i/PEi \qquad \text{(equation 3)}$$

Prior to determining the maximum tolerable latency at act 302, the processor may first calculate the available stall time of the component in each operational time window. This is calculated from the length of the operational time window and a reserved processing time. The reserved processing time is the time needed in each operational time window for the processor to perform computations, including processing the responses received to the commands that the component sent out. The available stall time for an operational time window of a component may be determined by:

$$TS_i=WL_i*(1-RS_i) \qquad \text{(equation 4)}$$

where $TS_i$ is the available stall time of the component in an operational time window i, $WL_i$ is the length of the operational time window i, and $RS_i$ is the proportion of time reserved for the component to perform computations such as processing received responses.

Having determined the maximum tolerable latency for the operational time window of the component, the processor then moves on to act 306. At act 306, the processor compares the measured latency to the maximum tolerable latency. If the measured latency is greater than the maximum tolerable latency, then at act 307, the processor determines that measured latency to be anomalous. If the measured latency is less than the maximum tolerable latency, then at act 308, the processor determines that measured latency not to be anomalous.

At act 306, the processor may compare each of the latencies measured at act 301 to the maximum tolerable latency. Alternatively, the processor may compare a subset of the measured latencies to the maximum tolerable latency at act 301. For example, each of the series of monitored time windows, the maximum latency of the measured latencies in that monitored time window may be the only measured latency of that monitored time window which the processor compares to the maximum tolerable latency at act 306. For each operational time window, the processor may aggregate the maximum latencies of the set of monitored time windows that maps onto that operational time window, to yield a set of maximum latencies of that operational time window. Those are then the maximum latencies that are compared to the maximum tolerable latency in act 306 for the iteration of the method of FIG. 3 for that operational time window.

Following the detection of latent communications as anomalous or not at acts 307 and 308, the control loop returns to act 301, where the processor performs the method of FIG. 3 for the next operational time window. Thus, each iteration of FIG. 3 is performed on a new operational time window. Each operational time window may be non-overlapping with the previous operational time window. For example, the operational time windows may be contiguous. Alternatively, the operational time windows may be overlapping.

As mentioned above, acts 302 to 308 may be performed at the monitoring unit, at an on-chip analyser, or at an off-chip analyser. Furthermore, as mentioned above, the maximum latency of the measured latencies in a series of monitored time windows may be determined at the monitoring unit or at the analyser.

Figure 4:
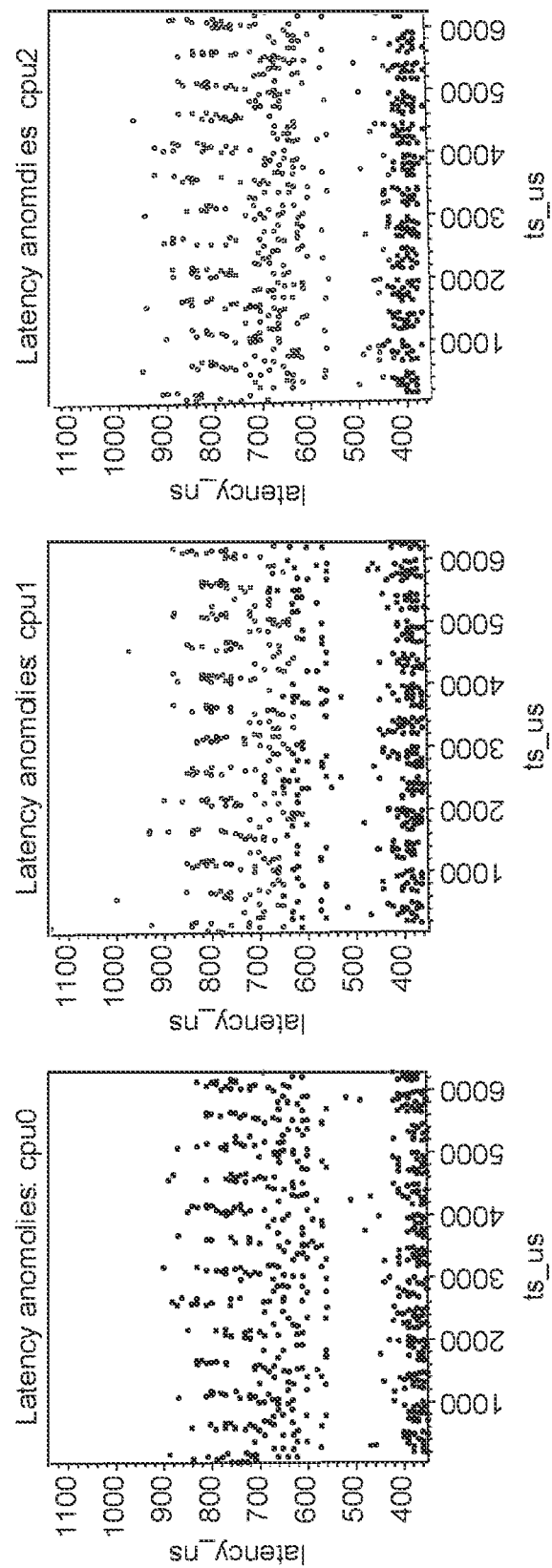
FIG. 4 illustrates examples of those measured latencies detected to be anomalous in the communications of three CPUs.

FIG. 4 illustrates measured latencies for each of three CPUs. The measured latencies vary between a floor level (of about 400 ns) to up to about 1000 ns. Higher latencies are caused by competition from other bus masters. Those measured latencies which are detected as anomalous by the method of FIG. 3 are shown in grey. The measured latency profile is similar for all three CPUs. However, the number of measured latencies that are detected to be anomalous is very different, from none for CPU0, to some of them for CPU1, to most of them for CPU2. This is because CPU0 has little communication activity, and thus a higher maximum tolerable latency. Whereas CPU2 is much busier with a lot of communication activity, and thus a lower maximum tolerable latency.

The method described with respect to FIG. 3 identifies long latencies in communications when it is problematic to the component. In other words, it identifies latencies which cause the component to not be able to complete its operations in its required timeframes. In operational time windows full of traffic, even moderate latencies are problematic, and hence are flagged by this method. Conversely, in operational time windows with little traffic, occasional long latencies are not problematic to the operation of the component, and hence are not flagged by this method.

A method for comparing different components of the SoC by analysing the parameters measured by the monitoring units will now be described with reference to FIG. 5.

At act 501, the bandwidth of each monitored time window is determined. This bandwidth can be derived from the number of communications in the monitored time window 502, and the length of the monitored time window.

At act 503, the processor determines a set of bandwidths and latencies 504 for each of a series of operational time windows of the component. For each operational time window, the processor may aggregate the bandwidths of the set of monitored time windows that maps onto that operational time window, to yield a set of bandwidths of that operational time window. For each operational time window, the processor may aggregate the measured latencies of the set of monitored time windows that maps onto that operational time window, to yield a set of measured latencies of that operational time window.

The processor may determine the set of latencies for each series of operational time windows of a component to be a subset of the measured latencies of the corresponding monitored time windows. For example, for each operational time window, the processor may aggregate the maximum latencies of the set of monitored time windows that maps onto that operational time window, to yield a set of maximum latencies of that operational time window.

The processor then moves onto act 505. At act 505, the processor correlates the set of bandwidths and latencies for each of the series of operational time windows of the component. The processor may correlate sets of bandwidths and latencies for operational time windows which are shifted in time with respect to each other.

The method acts 501 to 505 are performed for each component to be compared. At act 506, the processor then compares the correlations of the different components.

Comparing the correlation between bandwidth and latency for all the components aids in understanding which data flows affect one another. It therefore aids understanding of how the behaviour of the SoC as a whole is affected by the communication circuitry 203. By performing correlations on a series of operational time windows shifted with respect to each other, dependencies that are far apart in time may be detected.

The characteristics of how much bandwidth a component of an SoC needs and how much latency it will tolerate are not fully known at the time of SoC design. They also vary during use. The methods described herein enable these parameters to be calculated on the fly from non-intrusive measurements taken by monitoring circuitry on the SoC. The methods described are therefore able to detect anomalous latencies and provide a measure of how the data flows of the components through the communication circuitry affect each other by means of comparing correlation data for the different components.

Each component of the SoCs illustrated in FIGS. 1 and 2 may be implemented in dedicated hardware. Alternatively, each component of the SoC illustrated in FIGS. 1 and 2 may be implemented in software. Some components may be implemented in software, whilst other components are implemented in dedicated hardware.

The SoC described is suitably incorporated within a computing-based device. The computing-based device may be an electronic device. Suitably, the computing-based device includes one or more processors for processing computer executable instructions to control operation of the device in order to implement the methods described herein. The computer executable instructions can be provided using any computer-readable media such as a memory. The methods described herein may be performed by software in machine readable form on a tangible storage medium. Software can be provided at the computing-based device to implement the methods described herein.

The above description describes the system circuitry and monitoring circuitry as being included on the same SoC. In an alternative implementation, the system circuitry and monitoring circuitry are included across two or more integrated circuit chips of an MCM. In an MCM, the integrated circuit chips are typically stacked or located adjacently on an interposer substrate. Some system circuitry may be located on one integrated circuit chip and other system circuitry located on a different integrated circuit chip of the MCM. Similarly, the monitoring circuitry may be distributed across more than one integrated circuit chip of the MCM. Thus, the method and apparatus described above in the context of a SoC also apply in the context of an MCM.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of detecting anomalous latencies in communications between components on an integrated circuit (IC) chip, the method comprising:
   (i) monitoring communications between a first component of the IC chip and other components of the IC chip, each communication comprising a command sent from the first component to a second component of the other components, and a response received by the first component from that second component, the monitoring comprising:
      measuring a number of communications in each of a series of monitored time windows, and
      measuring a latency of each communication in the series of monitored time windows;
   (ii) calculating a maximum tolerable latency for each operational time window of the first component from the number of communications in that operational time window, an available stall time of the first component in that operational time window, and a latency penalty factor for that operational time window; and
   (iii) determining a measured latency to be anomalous when the measured latency is greater than the maximum tolerable latency.

2. The method as claimed in claim 1, wherein the latency penalty factor for an operational time window is an average minimum number of bytes that the first component can tolerate between latent responses in that operational time window.

3. The method as claimed in claim 2, wherein the maximum tolerable latency of the operational time window is calculated according to:

$$MTL_i = TS_i * BP_i / B_i$$

where $MTL_i$ is the maximum tolerable latency of operational time window i, $TS_i$ is an available stall time of the first component in the operational time window i, $BP_i$ is the latency penalty factor in the operational time window i, and $B_i$ is a number of bytes in the operational time window i.

4. The method as claimed in claim 1, wherein act (iii) comprises:
   determining a maximum latency of the measured latencies in each of the series of monitored time windows;
   comparing the maximum latency to the maximum tolerable latency; and
   determining the maximum latency to be anomalous when the maximum latency is greater than the maximum tolerable latency.

5. The method as claimed in claim 1, further comprising calculating the available stall time of the first component in each operational time window from an operational time window length and a reserved processing time, the reserved processing time being that used by the first component to perform computations.

6. The method as claimed in claim 5, wherein the available stall time of the first component in each operational time window is calculated according to:

$$TS_i = WL_i * (1-RS)$$

where $TS_i$ is the available stall time of the first component in the operational time window i, $WL_i$ is a length of the operational time window i, and $RS_i$ is a proportion of time reserved for the first component to perform computations.

7. The method as claimed in claim 1, further comprising determining a bandwidth of each of the series of monitored time windows from the measured number of communications in that monitored time window.

8. The method as claimed in claim 7, further comprising determining a set of bandwidths and latencies for each of a series of the operational time windows of the first component from the bandwidths and the measured latencies of the series of monitored time windows of act (i).

9. The method as claimed in claim 8, wherein each operational time window is greater than each monitored time window.

10. The method as claimed in claim 9, comprising aggregating the bandwidths and measured latencies of the series of monitored time windows of act (i) to form the set of bandwidths and latencies for each of the series of operational time windows of the first component.

11. The method as claimed in claim 8, wherein the latencies of each of the series of operational time windows of the first component are maximum latencies of the series of monitored time windows.

12. The method as claimed in claim 8, further comprising correlating the bandwidth and measured latency for each of the series of operational time windows.

13. The method as claimed in claim 12, wherein the correlation comprises correlating the bandwidth and maximum latency for each of the series of operational time windows.

14. The method as claimed in claim 1, further comprising monitoring communications between each component of a set of third components on the IC chip and other fourth components of the IC chip, the monitoring of each component of the set being according to act (i).

15. The method as claimed in claim 14, further comprising, for each component of the set, determining a bandwidth of each of the series of the monitored time windows from the measured number of communications in that monitored time window.

16. The method as claimed in claim 15, further comprising, for each component of the set of components, correlating the bandwidth and measured latency for each of a series of operational time windows.

17. The method as claimed in claim 16, wherein the correlation comprises correlating the bandwidth and maximum latency for each of the series of the operational time windows.

18. The method as claimed in claim 16, wherein the correlation comprises correlating the bandwidth and maximum latency of the operational time windows which are shifted in time with respect to each other.

19. The method as claimed in claim 16, further comprising comparing the correlations of the different third components of the set of the third components.

20. An integrated circuit (IC) chip comprising:
 system circuitry comprising components;
 monitoring circuitry configured to monitor communications between the components of the system circuitry, each communication comprising a command sent from a first component of the components to a second component of the components, and a response received from the second component by the first component, the monitoring circuitry comprising:
  a counter configured to measure a number of the communications in each of a series of monitored time windows;
  a latency timer configured to measure a time taken between a command being sent from the first component to the second component, and a response being received by the first component; and
 a processor configured to:
  calculate a maximum tolerable latency for each operational time window of the first component from the number of communications in that operational time window, an available stall time of the first component in that operational time window, and a latency penalty factor for that operational time window; and
  determine a measured latency to be anomalous when the measured latency is greater than the maximum tolerable latency.

* * * * *